United States Patent [19]

Hanaway et al.

[11] Patent Number: 5,623,862
[45] Date of Patent: Apr. 29, 1997

[54] LONG STROKE SPRING BRAKE ACTUATOR

[75] Inventors: Roger D. Hanaway, Blue Springs, Mo.; John Heard, III; Albert D. Fisher, both of LaHarpe, Kans.

[73] Assignee: Midland Brake, Inc., Kansas City, Mich.

[21] Appl. No.: 516,444

[22] Filed: Aug. 17, 1995

[51] Int. Cl.$^6$ .................................................. F01B 7/00
[52] U.S. Cl. ........................................ 92/63; 92/48; 92/98
[58] Field of Search ................................ 92/48, 63, 161, 92/96, 98 R, 98 D, 101, 102

[56] References Cited

U.S. PATENT DOCUMENTS

| | | | |
|---|---|---|---|
| 2,448,981 | 9/1948 | Ingres | 121/41 |
| 2,467,517 | 4/1949 | Almond | 60/54.5 |
| 2,504,691 | 4/1950 | Ingres | 60/54.5 |
| 2,992,630 | 7/1961 | Leighton et al. | 121/38 |
| 3,020,094 | 2/1962 | Murty et al. | 303/9 |
| 3,101,133 | 8/1963 | House et al. | 188/170 |
| 3,101,219 | 8/1963 | Herrera | 303/6 |
| 3,107,583 | 10/1963 | Woodward | 92/63 |
| 3,112,959 | 12/1963 | Kateley | 303/6 |
| 3,117,496 | 1/1964 | Dobrikin | 92/63 |
| 3,131,609 | 5/1964 | Dobrikin et al. | 92/63 |
| 3,244,079 | 4/1966 | Herrera | 92/63 |
| 3,285,672 | 11/1966 | Avera | 303/9 |
| 3,291,004 | 12/1966 | Stevenson et al. | 92/63 |
| 3,331,291 | 7/1967 | Rumsey | 92/63 |
| 3,380,349 | 4/1968 | James | 91/357 |
| 3,439,585 | 4/1969 | Herrera | 92/130 |
| 3,450,008 | 6/1969 | Fites | 92/24 |
| 3,502,003 | 3/1970 | Dobrikin et al. | 92/63 |
| 3,508,470 | 4/1970 | Swander, Jr et al. | 92/63 |
| 3,515,438 | 6/1970 | Stevenson et al. | 303/9 |
| 3,548,720 | 12/1970 | Swander, Jr et al. | 92/63 |
| 3,630,093 | 12/1971 | Herrera | 92/63 |
| 3,696,711 | 10/1972 | Berg et al. | 92/48 |
| 3,710,692 | 1/1973 | Valentine | 92/63 |
| 3,719,125 | 3/1973 | Cannella | 92/133 |
| 3,730,056 | 5/1973 | Swander, Jr. | 92/48 |
| 3,736,842 | 6/1973 | Valentine | 91/1 |

(List continued on next page.)

OTHER PUBLICATIONS

Reproduction of a drawing of a brake chamber which is believed to be Midland Ross N4330 sold from about 1973 to about 1980.
Reproduction of a Wagner Electric Corporation four-page brochure dated Jun. 1, 1977, describing its Spring Brake Chamber KU-1110.
Prosecution history of abandoned reissue application 07/966,094, filed Oct. 21, 1992, based on Bowyer U.S. Patent 5,105,727 (BU above).

Primary Examiner—Hoang Nguyen
Attorney, Agent, or Firm—Leydig, Voit & Mayer, Ltd.

[57] ABSTRACT

A long-stroke fail-safe spring brake assembly for heavy duty vehicles comprises aligned first and second cups secured adjacent one another to form a housing for a compressed power spring which biases a spring piston, a hollow tubular push rod having one end open and sealingly secured, preferably by press fitting, to the spring piston and the other end closed and extending sealingly through the second cup for reciprocal control of a brake actuator by the power spring, an annular-shaped flexible diaphragm having an outer periphery radially-sealingly secured adjacent between the cups and an inner periphery sealingly secured adjacent the outer periphery of the spring piston, the intermediate portion of the diaphragm being disposed radially-outwardly of the spring piston. The spring piston is disposed to compress the compressed spring still further toward the first cup under the influence of a compressed fluid medium, the push rod, and the spring piston being sealingly secured to each other. The hollow interior of the push rod houses an elongated caging member having a distal portion confined therein which prevents separation of the compressed spring from the first cup in the event the latter is separated from the second cup. The push rod reciprocates sealingly through the second cup by a centerseal bearing comprising opposed interlocked plastic components sealed to each other by fused contact.

26 Claims, 4 Drawing Sheets

U.S. PATENT DOCUMENTS

| | | | |
|---|---|---|---|
| 3,800,668 | 4/1974 | Valentine | 91/399 |
| 3,811,365 | 5/1974 | Gordon et al. | 92/63 |
| 3,908,520 | 9/1975 | Ma | 92/94 |
| 3,926,094 | 12/1975 | Kurichh et al. | 92/63 |
| 4,031,814 | 6/1977 | Lukens et al. | 92/63 |
| 4,043,251 | 8/1977 | Ohmi | 91/376 |
| 4,263,840 | 4/1981 | Herrera | 92/63 |
| 4,303,006 | 12/1981 | Burke et al. | 92/85 |
| 4,353,291 | 10/1982 | Hauduc | 92/99 |
| 4,565,120 | 1/1986 | Gray et al. | 92/130 |
| 4,640,135 | 2/1987 | Kastel et al. | 73/716 |
| 4,664,016 | 5/1987 | Tobisawa et al. | 91/369 |
| 4,850,263 | 7/1989 | Ramsey et al. | 92/63 |
| 4,936,758 | 6/1990 | Coble | 417/413 |
| 4,945,818 | 8/1990 | Ware | 92/63 X |
| 4,960,036 | 10/1990 | Gummer et al. | 92/63 |
| 5,002,164 | 3/1991 | Bowyer | 188/170 |
| 5,016,523 | 5/1991 | Bowyer | 92/63 |
| 5,067,391 | 11/1991 | Choinski et al. | 92/48 |
| 5,105,727 | 4/1992 | Bowyer | 92/63 |
| 5,193,432 | 3/1993 | Smith | 92/63 |
| 5,205,205 | 4/1993 | Choinski et al. | 92/63 |
| 5,263,403 | 11/1993 | Choinski et al. | 92/63 |
| 5,311,809 | 5/1994 | Choinski et al. | 92/63 |
| 5,315,918 | 5/1994 | Pierce | 92/63 |
| 5,320,026 | 6/1994 | Pierce | 92/63 |
| 5,345,858 | 9/1994 | Pierce | 92/48 |
| 5,353,688 | 10/1994 | Pierce et al. | 92/48 X |
| 5,372,059 | 12/1994 | Pierce et al. | 92/48 |
| 5,377,579 | 1/1995 | Pierce | 92/63 |
| 5,433,138 | 7/1995 | Choinski et al. | 92/128 |

LONG STROKE SPRING BRAKE ACTUATOR

BACKGROUND OF THE INVENTION

1. Field of the Invention

This invention relates to fail-safe spring brake actuators for heavy-duty motor vehicles. More specifically, it relates to an improved air-released, spring-applied brake actuator which provides more actuator stroke per unit of spring brake chamber length and chamber weight, has desirable safety features, has fewer components and simplified construction and can be manufactured at competitive cost.

2. Discussion of the Prior Art

Heavy duty vehicles such as trucks, particularly when loaded, have high inertial masses which require powerful braking systems for control at the high speeds common today. Such systems are usually fluid operated and controlled, typically employing pressurized air as the fluid medium.

Since air pressure may be lost due to a number of common exigencies, e.g., compressor failure, hose rupture, connector problems, miscellaneous leakage in the system and the like, the service brakes require a fail-safe backup which automatically applies the vehicle brakes in the event of significant air pressure loss. Similarly, a fail-safe backup is dictated for the parking mode, particularly in view of long-term parking exigencies. A popular backup system relies on a powerful coil spring controlled by pressurized air within a chamber and operatively connected to the brake actuator arm so as to release the brake in the presence of adequate air pressure and to apply the brake in the absence thereof.

These air-released, spring-applied assemblies are well known and the chambers for same are advantageously integrated with service brake chambers, a widely-accepted application of the technology in the heavy-duty motor vehicular field. Accordingly, while the present invention is directed primarily to the spring brake assembly, it will be illustrated herein in connection with the combination spring brake and service brake integrated assemblies, although not necessarily limited thereto.

The assemblies illustrated in many prior art patents and other prior art suffer from certain limitations, the solution to certain of which the present invention is directed. Thus, for example, one prior art limitation is the insufficiency of the brake actuator stroke. Manifestly, such deficiency limits brake performance or duration thereof, requires more frequent actuator adjustments and lining replacements and is otherwise undesirable, as those skilled in the art have recognized.

While actuator chambers can be readily designed or re-designed and enlarged to provide a longer stroke, and even assuming the associated increased costs are acceptable, the space available for installation of the brake actuator may be limited, thereby preventing such enlargement. Moreover, even if space is not limiting, the typical combination springbrake, service-brake combination is mounted on the truck or trailer underside by means of several bolts at one extremity of the brake chamber. Thus, a larger brake chamber, and consequently a longer and heavier chamber, undesirably increases the bending moment and stress on both the chamber extremity and the associated underside support structure of the vehicle. This problem is aggravated by the severe jolts and other very stressful forces typically encountered by heavy duty vehicles traveling at high speeds on rough road surfaces.

Another problem with the powerful compressed springs in such spring brake chambers is the fact that after the springs are allowed to expand within the confines of the chamber so as to apply the brakes, usually in a parking mode, the spring is still highly compressed and typically exerts a force within the chamber of as much as 1,000–1,200 pounds or more. Accordingly, if the chamber is inadvertently opened by a driver or service man without properly caging or otherwise securing the still-compressed powerful spring, damage and personal injury can result.

This problem is recognized and addressed by certain of the prior art patents. These include, for example, U.S. Pat. Nos. 4,565,120, 4,960,036 (and subsequent patents based thereon) and 5,105,727 (and subsequent reissue application Ser. No. 07/966,094 based thereon, now abandoned).

In the case of U.S. Pat. No. 4,565,120, a safety restraint is employed for such purposes; but it permits only partial separation of the bolted-together flanges, adds dimensionally to the chamber, and increases both the number of parts and manufacturing costs, as well as inconvenience of disassembly.

In the case of U.S. Pat. No. 4,960,036 (and subsequent patents based thereon) convenient disassembly in the field is intentionally inhibited or foreclosed, thereby limiting convenient internal access for inspection, repair or the like. In addition, even disassembly at a repair facility requires destructive deformation of the chamber sealing means and a significant level of care which through negligence or inadvertence may not always be present. A safe design not necessarily dependent upon such inconvenient and costly destructive approach for achieving safety is preferred.

In the case of U.S. Pat. No. 5,105,727, certain of the prior art shortcomings are avoided but the solution provided is devoid of a recognition of still other shortcomings. Thus, for example, no recognition or consideration is given to the desirability of maximizing the effective brake actuator stroke while limiting the brake chamber size and weight so as to accommodate limited installation spaces and minimize the aforementioned bending movements.

Another shortcoming of certain prior art assemblies is the need for and cost of additional machining required to provide a bearing surface for the reciprocating push rod where it sealingly passes through the common chamber wall of the centerbody into the service brake chamber and toward the actuator arm. This problem is encountered when employing, for example, a cast metal centerbody, a popular embodiment.

Again, to minimize the overall axial length of the chamber, at least a portion of the aforementioned bearing surface should be axially coincident with, not additive to, the common chamber wall, as will become apparent. Similarly, the diaphragm of the spring brake chamber should be disposed so that its thickness is axially-coincident with other requisite chamber components and thus not a necessary contributor to overall axial length.

Still another shortcoming of many prior art spring brake actuators is the fact that the outer circumferential periphery of the spring brake diaphragm is sealed by compression in an axial direction. Thus, the axial force of the power spring is undesirably oriented to have a tendency to unseal the diaphragm.

OBJECTS OF THE INVENTION

It is therefore a general object of the present invention to cope with such shortcomings of prior art spring brake chambers, whether or not integrated with service brake chambers.

It is another general object to provide a long stroke spring brake assembly which is dimensionally compatible with vehicular underbodies on which it is installed.

It is a specific object of the present invention to provide a spring brake assembly having a longer stroke without having to increase the chamber size or weight or bending moment comparably.

It is another specific object to provide a centerseal in the spring brake chamber which is axially coincident with the chamber wall so as to minimize chamber length and through which the push rod sealingly reciprocates without the expense of having to machine metallic bearing surfaces.

It is another specific object to minimize the hazard associated with a powerful compressed spring housed within a spring brake chamber.

It is another specific object to provide an inherent backup caging feature for the powerful compressed spring within a spring brake chamber in the event of spring brake chamber disassembly without normal spring caging or equivalent precautions.

It is another specific object in a particular embodiment to provide a spring brake chamber which may advantageously be disassembled in the field without deformation of the chamber components and without significant risk of inadvertent catastrophic expansion of the compressed power spring.

It is still another specific object to employ radial sealing of the outer periphery of the spring brake diaphragm whereby axial power spring forces are not a significant sealing problem.

It is another object to safely achieve the aforementioned objects of the present invention with minimal parts, simplified assembly and overall lower manufacturing costs.

These and other objects of the present invention will become apparent from the description hereinafter set forth.

SUMMARY OF THE INVENTION

These objects are provided by a spring brake assembly comprising axially-aligned first and second cups, peripheral edge portions of each being sealingly secured adjacent one another to form a spring brake chamber; a compressed power spring axially disposed within the chamber and exerting a force tending to force apart and separate the cups; an axially-aligned, reciprocally-movable spring piston in the chamber having a spring side and an opposed second or push-rod side, the opposed forces of the compressed power spring being exerted toward the aligned interior of the first cup, and in the opposite direction toward the spring side of the spring piston. The assembly also comprises an axially-aligned push rod having one end portion operatively and sealingly secured to and movable with the push-rod side of the spring piston, the other end and intermediate portions extending slidingly and sealingly through a centrally-apertured portion of the second cup for reciprocal fail-safe control of a brake actuator arm.

The spring brake assembly also comprises a generally annular-shaped flexible diaphragm having an outer peripheral portion sealingly secured between the adjacent peripheral edge portions of the first and second cups. Preferably, the registering outer peripheral portion of the diaphragm and the adjacent peripheral edge portions of the cups are configured to provide radial sealing of the diaphragm, rather than axial compressive sealing thereof. The diaphragm also has an inner peripheral portion sealingly secured adjacent the outer periphery of the spring side of the spring piston and disposed within the chamber radially outwardly from the spring piston so as to be free and clear of contact with the push rod side of the spring piston throughout the reciprocation thereof.

As will be apparent from the drawings, the spring piston and diaphragm in effect sealingly divide the spring brake chamber into two subchambers, i.e., a first subchamber on the spring side of the spring piston for the power spring itself, and a second subchamber on the push-rod side wherein a pressurized fluid medium, e.g., compressed air, may be introduced to control the axial position of the spring piston and thereby the further compression of the power spring and the axial position of the push rod. The spring piston and diaphragm are thus disposed to move the spring piston and thereby compress the compressed spring still further when subjected to a fluid medium at sufficient pressure, and to release the same upon sufficient exhaustion of the pressurized medium, whereby the spring piston and the push rod are reciprocally controlled.

As above indicated, the one end portion of the push rod and the spring piston are sealingly secured to each other, preferably by press-fitted engagement, whereby the secured portions move as a unit under the influence of the power spring and any counterbalancing forces produced by the pressurized medium. In a specific embodiment, the aforementioned push rod has a hollow tubular interior with an open end disposed towards the first cup and a closed end disposed towards the brake actuator, the open end being partially restricted. The hollow interior provides a housing for an axially-disposed elongated caging member or release bolt having a portion extending from the open end of the push rod and being threaded to the first cup and having a head such as a bolt head exposed for rotation and positioning of the caging member. The caging member has an opposed interior distal end of expanded diameter exceeding the dimension of the partially-restricted open end of the push rod so as to be permanently confined within the hollow interior thereof.

The axial disposition of the caging member is thus manually and mechanically controllable by rotation of the exposed bolt head so as to engage or release the spring piston and thereby to increase or decrease the compression of the power spring and the position of the push rod in the absence of overriding pressure of the pressurized medium. The confined expanded interior distal end of the caging member is disposed so as to prevent the power spring from being inadvertently released from the first cup. This is an important safety feature, particularly when employing releasable bolted bands to join the peripheries of the cups forming the spring brake assembly.

In this regard, the maximum threaded travel of the caging member within the hollow interior of the push rod is a predetermined minimum travel greater than the maximum movement of the piston and push rod during braking operations., e.g., about 0.02"–0.50". This minimizes precipitous undesired spring expansion in the event of uncontrolled separation of the chamber cups. In effect, the power spring is permanently caged, as will be apparent from the detailed description.

· In a preferred embodiment, the open end of the push rod is partially restricted by the smaller-radius inner peripheral portion of the spring piston which is press-fitted thereto. This dual function of the spring piston simplifies the construction and reduces cost, as will also be apparent from the detailed description.

In still another specific embodiment the push rod reciprocates sealingly through the centrally-apertured portion of the second cup or centerbody by means of a centerseal bearing disposed therein and comprising opposed interlocked plastic components sealed to each other and to the periphery of the centrally-apertured portion of the second cup or centerbody. After installation, the interlocked plastic components are advantageously and conveniently sealed to each other by fused contact, preferably by ultrasonic welding techniques known to those skilled in the pertinent art. At least portions of the centerseal are axially coincident with radially-outward portions of the chamber wall to minimize overall chamber length.

The resulting fused plastic centerseal bearing is sealed to the centerbody itself by a resilient sealing element, such as a rubber or rubber-like O-ring of standardized design known to those skilled in the art. The centerseal bearing is similarly sealed to the reciprocating surface of the push rod by a suitable resilient wear-resistant seal. In each case, the resilient sealing element is housed in a suitable support pocket formed in the fused plastic components of the centerseal bearing.

As above indicated, the spring brake assembly may be operatively and integrally connected to an axially-aligned second chamber housing a service brake assembly jointly controlling a common brake actuator arm by component arrangements illustrated, for example, in U.S. Pat. No. 3,244,079 and many of the other patents set forth in the accompanying Information Disclosure Statement. In such advantageous combination of spring brake and service brake actuator, it will be noted that the aforementioned second cup is actually the spring brake section of an integrally-cast centerbody which also provides one of the opposed sections or cups of the in-line service brake chamber.

The spring brake and service brake combination is the presently-preferred embodiment which will also be described in connection with the accompanying drawings. As those skilled in the art will recognize, however, the invention is not necessarily limited to an integral combination of spring brake and service brake assemblies; and certain embodiments may be employed in the form of a separate spring brake assembly.

The peripheral edge portions of the first and second cups with the outer peripheral portion of the diaphragm intermediate thereto are sealingly secured to each other by techniques known to those skilled in the art and disclosed, for example, in prior art set forth in the aforementioned Information Disclosure Statement. These may include the bolted clamp band previously referred to, or a separate metal clamp band crimped by deformation over the edge portions. The edge portions may also be secured by deforming an integrally-formed extension of one edge portion of a cup over the outer periphery of the diaphragm and edge portion of the opposed cup. Embodiments of both the bolted and deformed versions are illustrated as part of the detailed description. As already indicated in either or both embodiments, the registering periphery of the diaphragm and cup edges are preferably configured to provide radial sealing, as will be apparent from the drawings.

BRIEF DESCRIPTION OF THE DRAWINGS

The present invention may be more clearly understood from the following description of specific and preferred embodiments read in conjunction with the accompanying drawings, wherein.

It should be understood that the drawings are not necessarily to exact scale and that when referring to physical relationships of components, the terms usually have reference to the orientation depicted in the drawings. Actual embodiments for specific installations may differ both structurally and dimensionally, depending upon the particular vehicles for which the braking systems are designed. This is illustrated, for example, in the few very minor variations or dissimilarities among the embodiments of FIGS. 1A, 1B, 2 and 3. Like components in the two embodiments share the same reference numerals for simplicity. It should also be understood, of course, that the invention is not limited to the particular embodiments illustrated.

DETAILED DESCRIPTION OF THE DRAWINGS

Figure 1A:
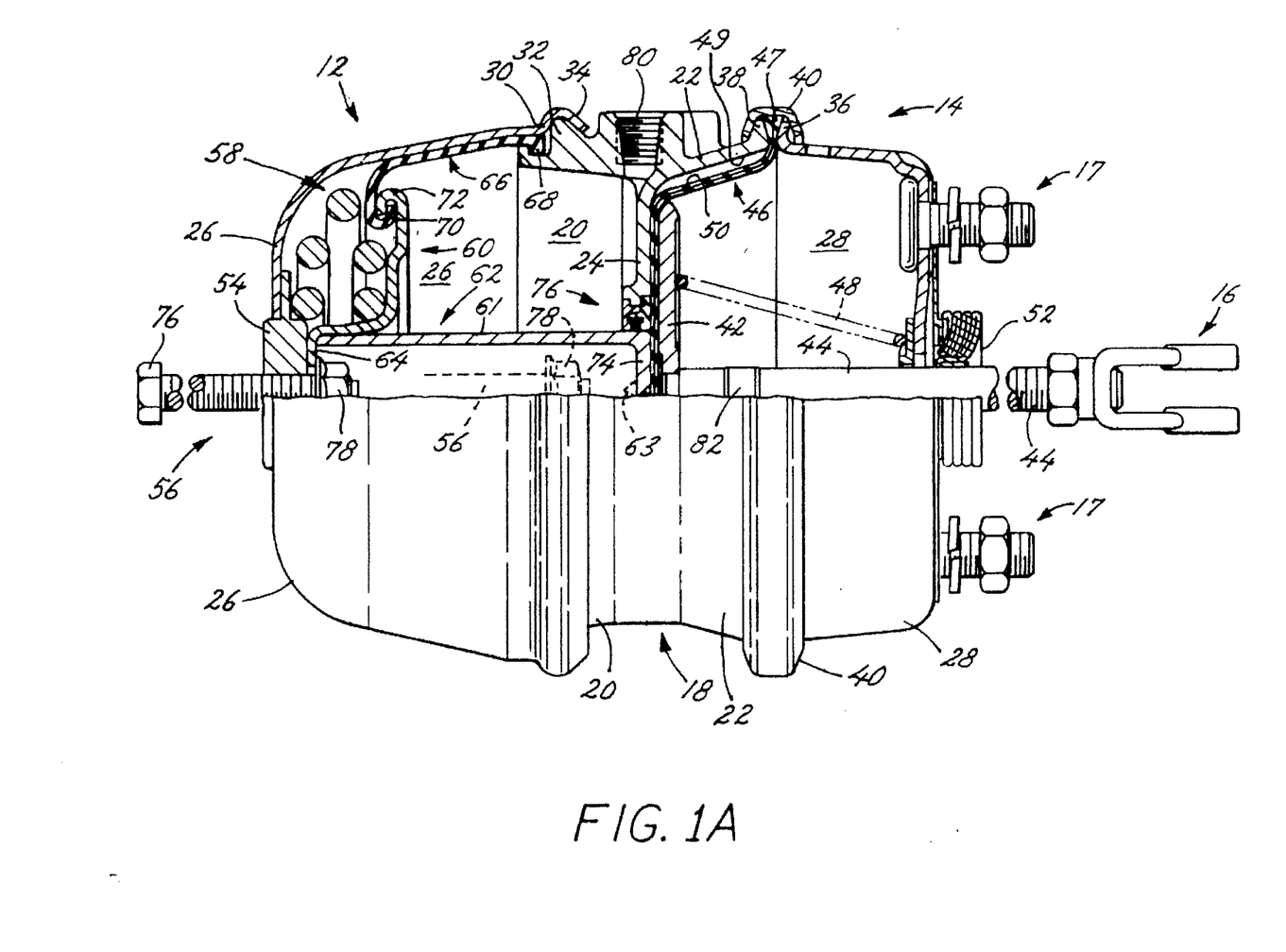
FIG. 1A is a sectional side view of a preferred embodiment of what those skilled in the art commonly refer to as a double diaphragm spring brake actuator which includes both spring and service brake chambers and incorporates the improvements of the present invention, the power spring being depicted in a fully-compressed state by means of a release bolt, the alternative position of the release bolt being shown in dashed lines.

Referring to FIG. 1A, the double diaphragm spring brake actuator comprises generally-cylindrical spring brake assembly or chamber 12 and generally-cylindrical service brake chamber or assembly 14, which jointly control a conventional brake actuator arm (not shown) which is secured to yoke 16. As already indicated, a feature of the present invention is the longer stroke of yoke 16 for a given overall chamber size, particularly the axial length of the combined spring brake and service brake chambers 12 and 14. This is achieved primarily by the novel integrated design of the spring brake chamber 12 described hereinafter.

The combination of spring brake assembly 12 and service brake assembly 14 is secured to the support structure (not shown) adjacent the brake actuator arm (not shown) by means of bolts 17. Manifestly, the smaller the overall dimensions of the combination, particularly the length, the lesser the stress resulting from such one-end cantilevered mounting. For such purposes, component clearances are minimized. Similarly, the materials of construction, the thicknesses thereof, the disposition and orientation of components, and the like are selected, consistent with mechanical and operating requirements, to minimize size and weight of the actuator.

Spring brake assembly 12 and service brake assembly 14 share cast centerbody 18 providing cups 20 and 22 on the left and right sides, respectively, of intervening wall 24. Cups 26 and 28 are secured to cups 20 and 22, respectively, to form spring and service brake chambers 12 and 14. For such purposes, a peripheral edge portion 30 of cup 26 is secured to peripheral edge portion 32 of cup 20 by means of integral flange 34 on edge portion 30 which is deformed over peripheral edge portion 32. Such deformation inhibits or prevents disassembly and internal servicing of the spring brake chamber 12 in the field. Peripheral edge portion 36 of cup 28 is secured to peripheral edge portion 38 of cup 22 by means of a bolted, two-piece clamp band 40 of conventional design. The use of a bolted clamp band facilitates ready access to the service brake chamber 14.

The service brake chamber 14 formed by cups 22 and 28 is generally similar to prior art designs and comprises service brake piston 42 which is secured to, and during normal service brake operation actuates, service brake push rod 44, and thus yoke 16, to the right under the influence of diaphragm 46 or to the left under the influence of return spring 48. The enlarged outer periphery 47 of service brake diaphragm 46 is sealingly secured between edge portions or peripheries 36 and 38 of cups 28 and 22, respectively, by the clamp band 40. The seal is achieved by virtue of the forces, essentially parallel to the axis of the chamber, exerted by peripheries 36 and 38 against the adjacent faces of enlarged periphery 47. Because the axial forces from return spring 48 are relatively small, axial (compressive) sealing of outer periphery 47 is feasible.

As above indicated, service brake diaphragm 46 exerts forces on piston 42 to actuate service brake push rod 44 and yoke 16 when under the influence of a pressurized fluid medium, e.g., compressed air, introduced in the space between the inner surface 49 of cup 22 and the facing surface 50 of diaphragm 46 at sufficient pressure to overcome the force of return spring 48 and other retarding forces encountered by piston 42, including frictional forces, until the desired brake application forces are applied. The pressurized fluid medium enters the space from an inlet (not shown) conventionally controlled by the driver's actuation of the brake pedal or the like.

Return spring 48 need only exert sufficient force to perform its return function under normal service brake operation, including return of the brake actuator arm and components actuated thereby to the brake-release position, assuming, of course, that the spring brake is already in the brake-release position. Pleated flexible protective cover 52 minimizes the entry of undesired moisture, dirt and the like into chamber 14 as the result of the reciprocation of push rod 44 and related structure.

Referring to spring brake chamber 12, cup 26 includes axially-disposed internally-threaded center portion 54 which is press fitted, welded, threaded or otherwise secured to form the axial center of cup 26 which receives release or caging bolt 56 threaded thereto. At least a portion of center portion 54 is axially coincident with the adjacent wall of cup 26 to minimize the axial length of the cup. As above indicated, the thicknesses of the wall of cup 26 and other relevant components are minimized consistent with mechanical and safety considerations, again to minimize axial length.

Compressed power spring 58 exerts opposed forces on head 26 and spring piston 60, the latter being secured and sealed, preferably by press fitting, to the exterior surface 61 of hollow spring brake push rod 62 adjacent the open end thereof. The inner periphery 64 of spring piston 60 also partially covers and restricts and narrows the open end of hollow push rod 62, again as shown.

Rubber or rubber-like flexible diaphragm 66, which may be internally reinforced, is sealed at its outer periphery 68 adjacent the juncture of peripheral edge portions of cups 20 and 26. In contrast to the axial seal of periphery 47 of service brake diaphragm 46, the outer periphery 68 of spring brake diaphragm 66, the registering recess or slot in the peripheral edge portion 32 of cup 20 and the peripheral edge portion 30 of cup 26 are configured to provide a radial seal, as those skilled in the art will recognize. Accordingly, the integrity of the seal is not threatened by the powerful axial forces in spring brake chamber 12 exerted by power spring 58. As already indicated, such consideration is not a factor in the service brake chamber 14 because spring 48 exerts only inconsequential forces from a chamber sealing standpoint.

In the embodiment of FIG. 1A, the inner periphery 70 of diaphragm 66 is secured and sealed adjacent the outer periphery 72 of the spring side of spring piston 60 by deforming the outer periphery 72 of spring piston 60 over the inner periphery 70 to form a sealed press or compressive fit. As will be apparent from FIG. 2, alternative means are also disclosed for forming the requisite diaphragm seal.

The sealing of diaphragm 66 to the spring side of spring piston 60, utilizes the free space adjacent power spring 58 for the diaphragm. This disposes the diaphragm so that it does not add to the axial length of chamber 12, as those skilled in the art will recognize. Similarly, employing the closed end 74 of spring brake push rod 62 as the reaction plate or piston transmitting power spring forces directly to diaphragm 46, and thus to service brake push rod 44, eliminates the need for, and the axial thickness of, a pressure plate or equivalent for such function. Other space-saving elements will become apparent hereinafter, which cumulatively permit a significantly longer stroke without comparable lengthening of the actuator, e.g., a 3" stroke actuator having substantially the same length as a prior art 2.5" stroke actuator. Alternatively, the same stroke length (e.g., 2.5") can be achieved in a smaller and lighter actuator. A half-inch increase in stroke represents a 20% increase, a significant and very-desirable improvement in a brake actuator.

Release bolt 56 is threaded lengthwise and has an exposed head 76 which is configured to receive a conventional open-end wrench or similar turning tool whereby release bolt 56 may be manually threaded axially inwardly or outwardly. Release bolt 56 has an enlarged interior distal end 78 having a diameter substantially larger than the inner periphery 64 of spring piston 60. Accordingly, inner end 78 is confined within hollow push rod 62 and is the means by which release bolt 56 may cage power spring 58, as depicted in full lines in FIG. 1A.

Release bolt 56 is also partially depicted in dashed lines in FIG. 1A to illustrate where it is disposed during normal brake operations. In such normal operations, power spring 58 would still be compressed as shown in FIG. 1A because of the presence of pressurized air in the spring brake chamber, supplied via port 80 and exerting sufficient force on the push-rod side of spring piston 60 to overcome the powerful compressed spring forces, e.g., as much as 2000 pounds or more.

While in the drawings the enlarged interior end 78 of release bolt 56 appears to be shaped like a nut disposed for rotation on the threaded bolt portion, it is in fact a nut welded in place so as to be non-rotatable or movable. This largely reflects manufacturing/assembly convenience and not a limitation. Other means for providing an enlarged distal end may be employed so long as the resulting enlarged distal end similarly functions to permanently capture power spring 58 within cup 26, particularly in the event that cup 26 should become separated from cup 20 for any reason. This feature is important even when release bolt 56 is threaded all the way into center portion 54 and power spring 58 is in its maximum expanded position within chamber 12 because power spring 58, while somewhat expanded, is still in a highly compressed state, typically exerting a force of as much as about 1000–1200 pounds or more. The permanent caging of power spring 58 in cup 26 is a safety feature of the present invention. This will become more apparent in the light of FIG. 1B.

Hollow push rod 62 sealingly reciprocates through the inner center aperture in wall 24 of centerbody 18. As will be apparent from FIG. 5, the pressure seal between wall 24 and the outer circular surface of push rod 62 is achieved by means of interlocked and fused plastic pieces supporting flexible seals such as rubber or rubber-like O-rings and functional sealing equivalents. Such structure obviates the necessity for the costly machining of the cast peripheral surfaces of the inner aperture in wall 24 which previously was required to provide a smooth bearing fit for push rod 62 and a pocket for housing a flexible seal.

Figure 1B:
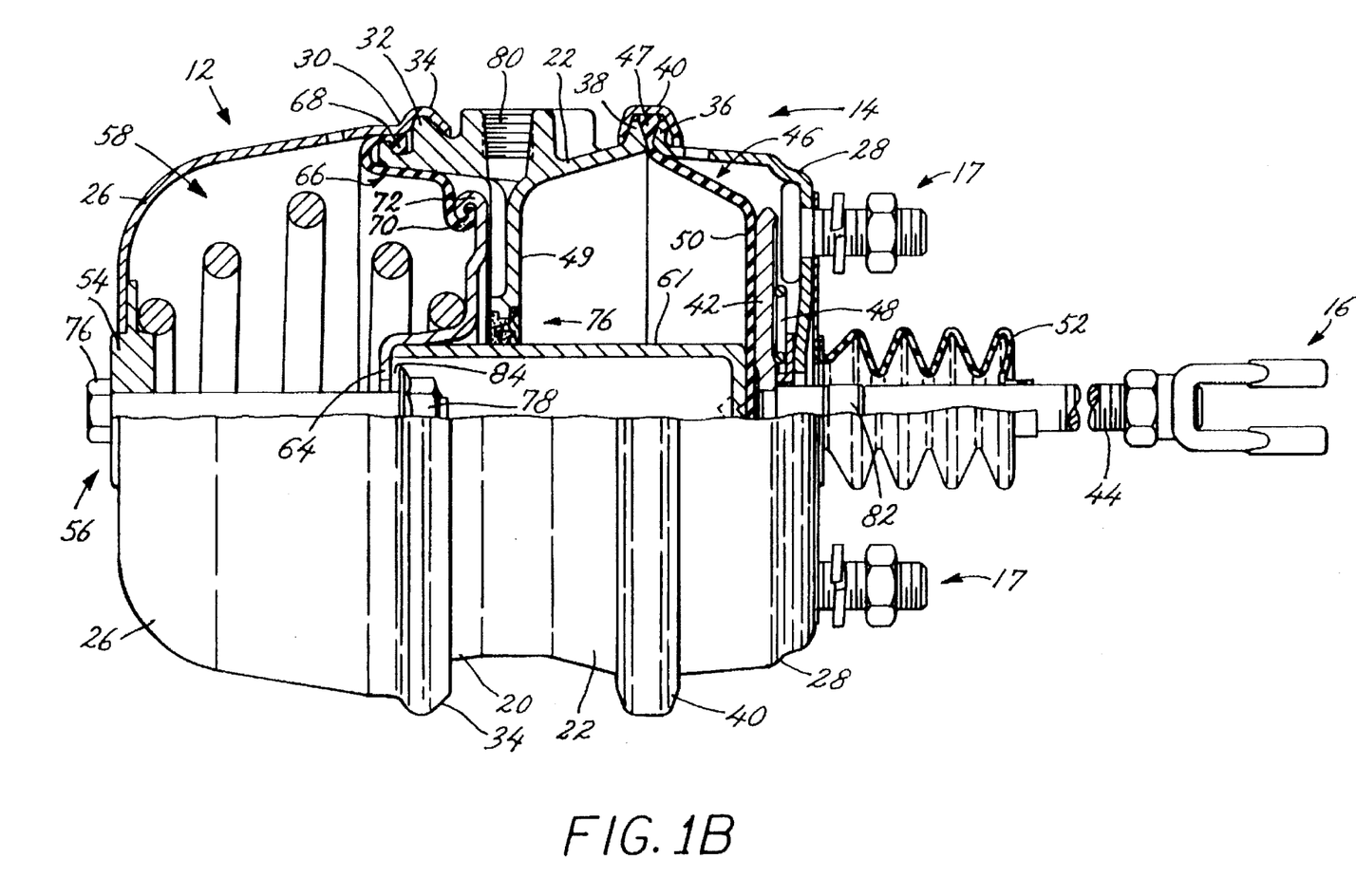
FIG. 1B is the same embodiment as FIG. 1A but shows the brake actuator with the power spring in its at-rest, expanded, brake-applied position within the spring brake chamber and depicting the maximum stroke.

Referring to FIG. 1B, with release bolt 56 in its innermost position and in the absence of spring brake release pressures at air inlet 80, power spring 58 will be expanded as indicated, forcing the right portion of push rod 62 into the service brake chamber. The closed right end 74 of push rod 62 has sufficient area so that, as above indicated, the spring brake forces can be transmitted directly via diaphragm 46 and service brake piston 42 to extend service brake push rod 44 to its maximum brake-applied position. This maximum stroke position depends in part upon the existing wear condition of the brake pads or linings, adjustment of the slack adjusters and the like, as those skilled in the art are fully aware.

In embodiments not including, or employing other protective means than, pleated protective cover 52, the maximum stroke of the service brake push rod is readily detectable to an observer by means of the stroke position indicator 82 on push rod 44. In the brake-applied, at-rest position, it is a convenient indicator of brake wear and/or the need for adjustment of slack adjusters or brake lining replacement. To facilitate visual inspection, it is customarily colored, e.g., "international orange" as known in the trade.

In view of the hazard represented by the compressed spring in the spring brake chamber even when in the at-rest, expanded, brake-applied position of FIG. 1B, such power spring should be caged before attempting to remove cup 26 from centerbody 18 for inspection or repair. As already indicated, this is conveniently done simply by rotating exposed head 76 of release bolt 56 so as to force spring piston 60 to the left so as to compress power spring 58, as depicted in FIG. 1A (solid lines). But even if through carelessness, inadvertence or otherwise, the power spring is not fully caged, the danger of an explosive total release of the spring is obviated inasmuch as enlarged interior end 78 of the release bolt 56 impinges against the inner periphery 64 of spring piston 60 and effectively cages it.

In the situation depicted in FIG. 1B, the maximum expansion of the power spring 58 would be limited to the minimal clearance 84 between enlarged interior end 78 and the inner periphery 64 of spring piston 60. In practice, the maximum threaded travel of the caging member within the hollow interior of push rod is a predetermined minimum travel, e.g., clearance 84, greater than the maximum stroke, that is, the movement of the spring piston 60 and push rod 62 during braking operations. As above indicated, the clearance is typically in the range of about 0.02" to 0.50".

While it may appear in FIG. 1B that the clearance between the push-rod side of spring piston 60 and intervening chamber wall 24 is excessive, there are strengthening ribs on the push-rod side (not apparent in FIG. 1B) which requires such clearance. In general, however, and as already indicated, such clearances should be minimized to maximize the stroke length of the brake actuator for a given overall axial length or to minimize the axial length for a given stroke length.

Figure 2:
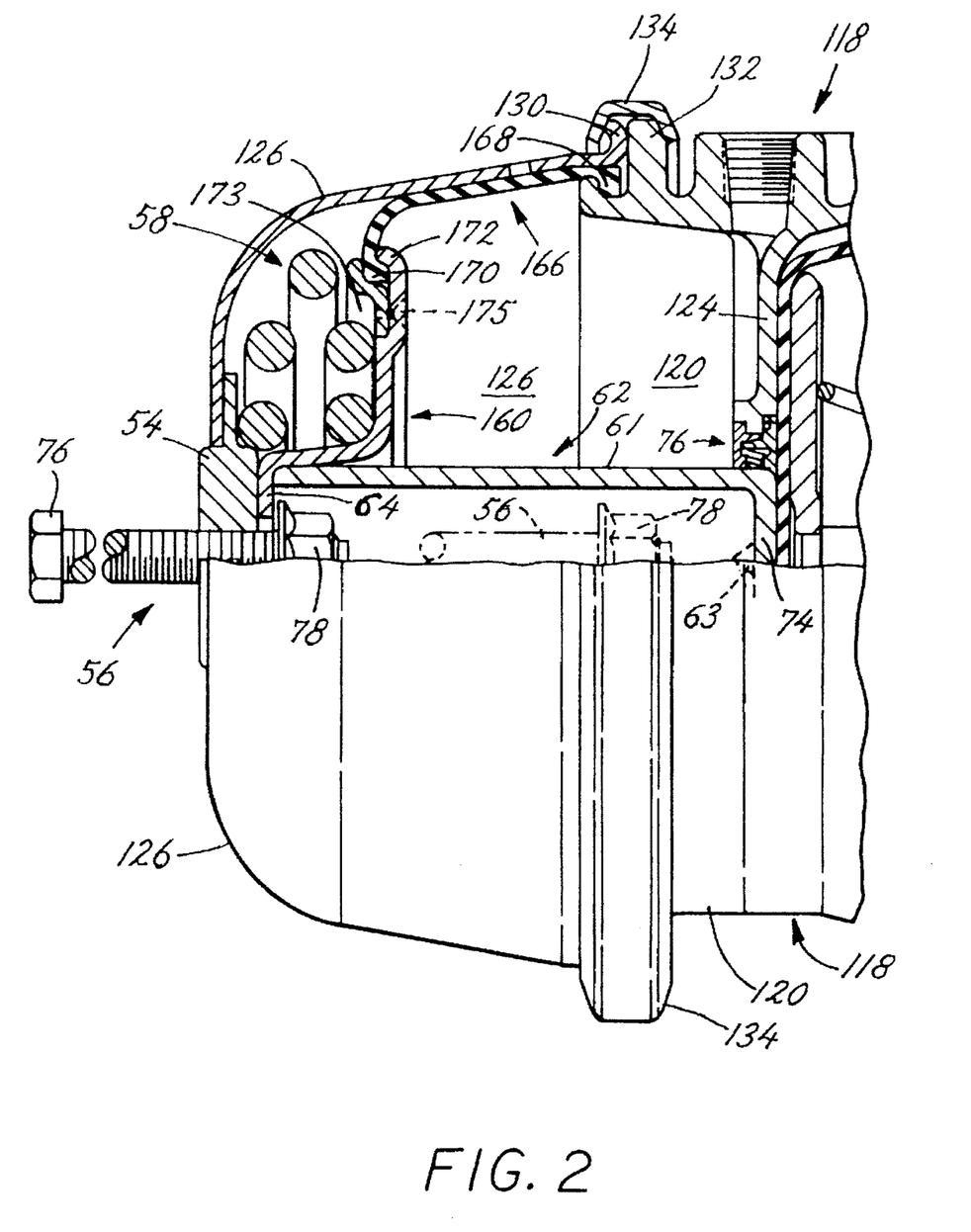
FIG. 2 is a fragmentary sectional view of an embodiment similar to FIG. 1A but incorporates alternative techniques for securing together the peripheries of the cups of the annular-shaped spring brake chamber and for securing the inner periphery of the spring brake diaphragm to the spring side of the power spring piston, either or both of which may optionally be substituted in the embodiment of FIGS. 1A and 1B.

Referring to fragmentary view of FIG. 2, the spring brake actuator depicted therein differs slightly in size and detail but is otherwise identical to that of FIGS. 1A and 1B. One difference is the use of a conventional two-piece bolted clamp band 134, rather than a deformed integral flange. Clamp band 134, which is similar to or the same as clamp band 40 of the service brake chamber (see FIGS. 1A and 1B), secures the peripheral edge portion 130 of cup 26 to edge portion 132 and sealingly engages the outer enlarged circumferential periphery 168 of diaphragm 166 therebetween, a radial seal as shown.

The use of a bolted clamp band in the embodiment of FIG. 2 has the advantage of permitting the disassembly of head or cup 126 from centerbody 118 for inspection and possible repair or replacement of internal elements within the spring brake chamber. Thus, for example, if the rubber seal of centerseal 76, which is in contact with surface 61 of push rod 62, is configured as a simple o-ring and requires replacement, it could be safely attended to in the field. The risk associated with inadvertent failure to cage the power spring before disassembly is mitigated by the permanent caging of the power spring 58 within cup or head 126, as previously described.

Such convenient inspection in the field would be foreclosed in the case of the embodiment of FIGS. 1A and 1B because the elastic deformation required to release integral flange 34 from edge portion 32 would normally require both special tools and handling by a skilled mechanic. As a practical matter, it may also require the replacement of head or cup 26 because of the resulting destructive edge deformations.

Another distinction between the embodiment of FIGS. 1A and 1B and the embodiment of FIG. 2 is the means for securing and sealing the inner periphery of the spring brake diaphragm to the outer periphery of the spring side of the spring piston. In the embodiment of FIG. 2, the inner periphery 170 of diaphragm 166 is secured and sealed to the outer periphery 172 of the spring side of spring piston 160 by means of removable inner curved annular band 173. This inner clamp band 173 is removably secured by means of a series of screws 175 or other removable securing devices around the periphery.

This embodiment is advantageous when combined with the removable outer clamp band embodiment of FIG. 2, although neither is limited to use with the other. For example, the ready access to the interior of cup 126 permitted by means of removable outer clamp band 134, which frees the outer periphery 168 of diaphragm 166, combined with the ability to release the inner periphery 170 of the diaphragm 166 by loosening or removing inner clamp band 173, permits enhanced further inspection. It would also permit, for example, replacement of diaphragm 166, or even the entire center body assembly, if desired. Again, the inherent safety attributable to the fact that spring 58 is caged, as already described, contributes to the feasibility of such alternatives.

Figure 3:
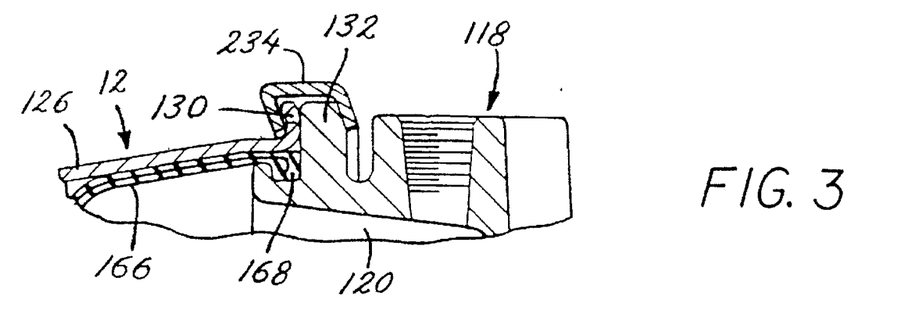
FIG. 3 is a fragmentary sectional view of the peripheries of the cups comprising of the spring brake chamber and showing still another optional embodiment wherein a separate continuous roll-formed band is employed for securing together the peripheries, which embodiment may alternatively be used in the assemblies of FIGS. 1A, 1B and 2.

FIG. 3 discloses still another embodiment employing a separate continuous roll-formed band 234 for securing peripheral edge portions 130 and 132 together and capturing outer circumferential periphery 168 of diaphragm 166 into a radial sealing relationship as previously described. Like the embodiment of FIGS. 1A and 1B, the roll-formed band provides a spring brake chamber which is internally tamper resistant due to the difficulty of separating the two cups of the spring brake chamber. Since the embodiments of both FIGS. 1A and 1B and FIG. 3 require destructive deformation of the metal holding the respective chambers together to gain internal access thereto, FIG. 3 may involve a less costly element, albeit a separate component. In short, the cost of replacing the deformed band 234 of the FIG. 3 embodiment may be less costly than replacing the deformed cup 26 of FIGS. 1A and 1B.

Figure 4A:
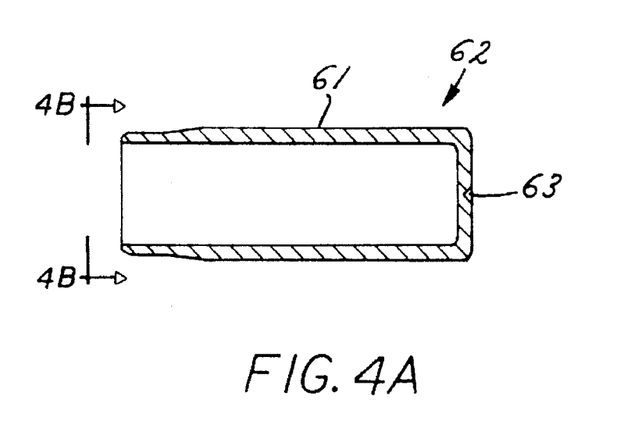
FIG. 4A is an elevational section view of the push rod employed in the embodiments of FIGS. 1A, 1B, and 2.
Figure 4B:
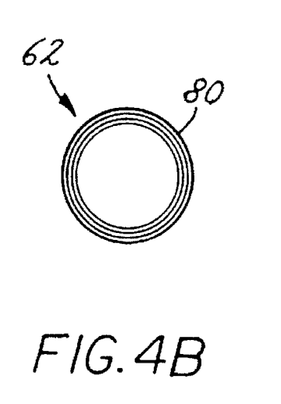
FIG. 4B is a view of the open end of the push rod as viewed from the left side of FIG. 4A.

Referring to FIGS. 4A and 4B, it is readily apparent that the push rod 62 has sufficient area at the circular closed end thereof (on the right as viewed in FIG. 3A) so as not to require a supplemental piston attached thereto for transmitting forces via the service brake diaphragm 46, piston 42 and push rod 44 to actuate yoke 16. This also saves internal axial space which can be utilized to lengthen the effective stroke for a given chamber length.

In addition, in contrast to certain prior art push rod arrangements, there is no differential area of the spring brake push rod 62 on which the air pressure in the spring brake chamber 12 acts to create a force tending to move push rod 62 towards the right into the service brake chamber 14. Accordingly, no compensating spring is required in the spring brake chamber. The elimination of such compensating spring saves additional space, which is effectively utilized to increase the stroke.

The V-shaped-appearing indentation 63 in the outer end surface of push rod 62 is for centering purposes during manufacture and assembly. The push rod surface 61 is sufficiently smooth to minimize wear and provide the desired bearing surface and seal in conjunction with the centerseal to be discussed in connection with FIG. 5.

Figure 5:
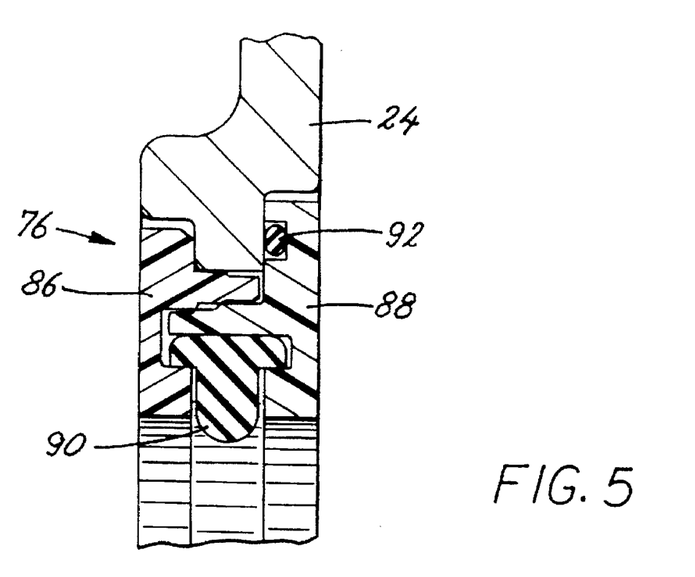
FIG. 5 is a section view of the centerseal employed in the centerbody of the embodiments of FIGS. 1A, 1B and 2, prior to fusing the interlocked plastic components.

Referring to FIG. 5, centerseal 76 preferably comprises, but is not limited to, interlocking plastic pieces 86 and 88 which are inserted from the respective sides of intervening wall 24 in the case of FIGS. 1 and 2 and intervening wall 124 in the case of FIG. 2. These provide a housing or pocket fop resilient seals 90 and 92, which seal the adjacent spaces of the spring brake and service brake chambers from each other. Seal 90, which may be an O-ring, a T-shaped seal or other suitable configuration, prevents leakage where surface 61 (FIGS. 1A, 1B and 2) of push rod 62 reciprocates through the center seal 76. O-ring 92 similarly performs a sealing function between centerseal 76 and the intervening wall 24 of centerbody 18 of FIGS. 1A and 1B, or intervening wall 124 of centerbody 118 of FIG. 2, respectively.

While shown in FIG. 5 as distinct interlocking pieces, plastic pieces 86 and 88 with O-ring 92 in place are advantageously fused together, after installation, by sonic welding techniques known to the those skilled in the art. Alternatively, the interlocking pieces can be designed to snap together in sealing relationship or be spin welded together or adhered together by suitable adhesives, or the like, as will be apparent to those skilled in the art. O-ring 92 is not subject to wear as is seal 90, which is in contact with the reciprocating surface 61 of push rod 62.

In a specific embodiment, fused plastic interlocking pieces 86 and 88 may comprise molded acetal plastic, a specific example of which is Delrin 100AF resin manufactured by or on behalf of E. I. dupont de Nemours & Co., Inc. The AF indicates that duPont's Teflon non-stick filler or coating is added thereto to provide better bearing surface properties. As previously indicated, utilization of a plastic centerseal permits the use of an as-cast centerbody and obviates the necessity for costly machining of the inner periphery of walls 24 or 124 which would otherwise be required to provide a suitable bearing surface and housing for a sealing medium.

The other materials of construction are in general well known to those skilled in the brake actuator art. Cups 26 or 126 (including threaded portion 54) and 28, release bolt 56, push rods 44 and 62, pistons 42 and 60, clamp bands 40 and 134, roll-formed band 234, yoke 16 and bolts 17 are typically a suitable steel. As already indicated, centerbody 18 or 118 may be cast aluminum. Diaphragms 46 and 66 or 166 are manufactured from a suitable rubber, preferably reinforced with a woven fabric, e.g., a thermoplastic polyamide (nylon). Similarly seals 90 and 92 may be rubber or equivalent.

As it is apparent from the above description, the spring brake assembly achieves the various objects of the present invention as previously set forth. Specifically, components have been eliminated within the spring brake chamber which provides a space for a longer stroke. In a specific embodiment, for example, the stroke of the actuator was increased by about 23% with only about a 2% increase in the overall length of the actuator and no significant increase in weight. This permits the installation of a longer stroke actuator in the same space that prior-art shorter stroke actuators occupied. (Alternatively, a smaller actuator having the same stroke length is feasible.)

In keeping with the object of maximizing actuator-stroke for a given chamber length and diameter or minimizing chamber length and diameter for a given actuator stroke, power spring 58 is configured as a double-conical helical spring. In the embodiment of the drawings, such configuration reduces the axial displacement of the compressed power spring without increasing the radial displacement excessively as compared with a single-conical helical spring or helical spring. Similarly, service brake chamber return spring 48 is configured as a single-conical helical spring, rather than helical, so that in its compressed state (depicted in FIG. 1A), its axial displacement is minimized.

The "permanently caged" power spring copes with the hazards associated with power spring actuators without requiring sealed units which inhibit field maintenance and require destructive access. Likewise the actuator of the present invention obviates the expense of having to machine certain bearing surfaces and, more generally, provides simplified assembly with minimal parts and overall lower manufacturing costs.

It is to be understood that any allowed claims based on this application are to be accorded a range of equivalents commensurate in scope with the advance made over the prior art.

Having described in the invention, what is claimed is:

1. A spring brake assembly comprising:
 (a) axially-aligned first and second cups, peripheral edge portions of each being secured adjacent one another to form a spring brake chamber;

(b) a compressed power spring axially disposed within said chamber and exerting a force tending to separate said first and second cups;

(c) an axially-aligned, reciprocally-movable spring piston in said chamber having a spring side and an opposite-facing push-rod side, the opposed forces of said compressed power spring being exerted in one direction on the aligned interior of said first cup and in the opposite direction on the spring side of said spring piston;

(d) an axially-aligned push rod having one distal end portion sealingly secured to and movable with said spring piston, the other distal end and intermediate portions extending slidingly and sealingly through a centrally-apertured portion of said second cup for reciprocal fail-safe control of a brake actuator; and (e) a generally-annular-shaped flexible diaphragm having an outer peripheral portion sealingly secured between said adjacent peripheral edge portions of said first and second cups and an inner peripheral portion sealingly secured adjacent the outer periphery of the spring side of said spring piston and disposed within the chamber radially outwardly from the spring piston so that subjecting the push-rod side of said spring piston to a fluid medium at sufficient pressure compresses said compressed power spring still further, and exhausting said pressurized fluid medium therefrom releases the additional compression of said power spring, whereby said spring piston and said push rod are reciprocally controlled.

2. The spring brake assembly of claim 1 wherein said push rod has a hollow interior with an open end disposed toward said first cup and a closed end toward the brake actuator, the open end being partially-restricted, said hollow interior providing a housing for an axially-disposed elongated caging member having a portion extending from the open end of said push rod and threaded to said first cup and having a head exposed for manual rotation and positioning of said caging member, and an opposed interior end of expanded diameter exceeding the dimension of the partially-restricted open end of said push rod so as to be confined within the hollow interior thereof, the axial disposition of said caging member being manually controllable by rotation of said head so as to engage or release said spring piston and thereby to increase or decrease the compression of said spring and the position of said push rod in the absence of overriding pressure of said pressurized medium, the confined expanded interior end of said caging member being disposed so as to prevent said spring from being released from said first cup.

3. The spring brake assembly of claim 2 wherein the maximum threaded travel of said caging member within the hollow interior of said push rod is a predetermined minimum travel greater than the maximum movement of said piston and said push rod during braking operations.

4. The spring brake assembly of claim 2 wherein the open end of said push rod is partially restricted by an inner peripheral portion of said spring piston which is press fitted thereto.

5. The spring brake assembly of claim 1 wherein said push rod reciprocates sealingly through said centrally-apertured portion of said second cup by means of a centerseal bearing disposed therein and comprising opposed interlocked plastic components sealed to each other and to the inner periphery of the centrally-apertured portion of said second cup and housing a resilient seal element in contact with the surface of said push rod.

6. The spring brake assembly of claim 5 wherein said interlocked plastic components are sealed to each other by fused contact.

7. The spring brake assembly of claim 1 operatively connected to an axially-aligned second chamber housing a service brake assembly jointly controlling a common brake actuator.

8. The spring brake assembly of claim 7 wherein said service brake assembly includes a flexible service brake diaphragm for controlling said common brake actuator, said one distal end of said spring brake push rod being disposed to be in direct contact with said flexible service brake diaphragm.

9. The spring brake assembly of claim 1 wherein the peripheral edge portions of said axially-aligned first and second cups are sealingly secured to one another by a deformed integral extension of one edge portion of one of said cups over the edge portion of the opposed cup.

10. The spring brake assembly of claim 1 wherein the peripheral edge portions of said axially-aligned first and second cups are sealingly secured to one another by a bolted clamp band.

11. The spring brake assembly of claim 1 wherein the peripheral edge portions of said axially-aligned first and second cups are sealingly secured to one another by a separate metal clamp band crimped by deformation over said edge portions.

12. The spring brake assembly of claim 1 wherein the outer peripheral portion of said flexible diaphragm is sealed to adjacent peripheral edge portion of said first and second cups by radial compression of said outer peripheral portion of said flexible diaphragm.

13. The spring assembly of claim 1 wherein said one end portion of said push rod, and said spring piston being sealingly secured to each other by press-fitted engagement.

14. The spring brake assembly of claim 1 wherein the inner peripheral portion of said generally-annular-shaped flexible diaphragm is sealingly secured adjacent the outer periphery of the spring side of said spring piston by deforming the outer periphery of the spring piston thereover to form a compressive seal.

15. The spring brake assembly of claim 1 wherein the inner peripheral portion of said generally-annular-shaped flexible diaphragm is sealingly secured adjacent the outer periphery of the spring side of said spring piston by an annular clamp band releasably secured adjacent said outer periphery of the spring side of said spring piston.

16. A spring brake assembly comprising:

(a) axially-aligned first and second cups, peripheral edge portions of each being secured adjacent one another to form a spring brake chamber;

(b) a compressed power spring axially disposed within said chamber and exerting a force tending to separate said first and second cups;

(c) an axially-aligned, reciprocally-movable spring piston in said chamber, the opposed forces of said compressed power spring being exerted in one direction on the aligned interior of said first cup and in the opposite direction on said spring piston;

(d) an axially-aligned push rod having one distal end portion operatively secured to and movable with said spring piston, the other end and intermediate portions extending slidingly and sealingly through a centrally-apertured portion of said second cup for reciprocal fail-safe control of a brake actuator;

(e) a centerseal bearing disposed in said centrally-apertured portion of said second cup and comprising opposed interlocked plastic components sealed to each other and housing a resilient sealing element in sealing contact with the surface of said push rod; and (f) a generally-annular-shaped flexible diaphragm having an outer peripheral portion sealingly secured between said adjacent peripheral edge portions of said first and second cups and an inner peripheral portion sealingly secured to said spring piston adjacent the outer periphery of the spring side of said spring piston, the intermediate portion of said diaphragm being disposed within the chamber radially outwardly from the spring piston, said spring piston compressing said compressed spring still further when the diaphragm is subject to a fluid medium at sufficient pressure, and to release the same upon sufficient exhaustion of the pressurized medium, whereby said spring piston and said push rod are reciprocally controlled;

said one end portion of said push rod and said spring piston being sealingly secured to each other by press-fitted engagement;

said spring brake assembly being operatively connected to an axially-aligned second chamber housing a service brake assembly disposed for joint reciprocal control of said brake actuator.

17. The spring brake assembly of claim 16 wherein said outer peripheral portion of said flexible diaphragm forms a radial seal between said adjacent peripheral edge portions of said first and second cups.

18. The spring brake assembly of claim 16 wherein the inner peripheral portion of said generally-annular-shaped flexible diaphragm is sealingly secured adjacent the outer periphery of the spring side of said spring piston by deforming the outer periphery of the spring piston thereover to form a compressive seal.

19. The spring brake assembly of claim 16 wherein the inner peripheral portion of said generally-annular-shaped flexible diaphragm is sealingly secured adjacent the outer periphery of the spring side of said spring piston by an annular clamp band releasably secured adjacent said outer periphery of the spring side of said spring piston.

20. The spring brake assembly of claim 16 wherein said push rod has a hollow interior with an open end disposed toward said first cup and a closed end toward the brake actuator, the open end being partially-restricted, said hollow interior providing a housing for an axially-disposed elongated caging member having a portion extending from the open end of said push rod threaded to said first cup and having a head exposed for manual rotation and positioning of said caging member, and an opposed interior end of expanded diameter exceeding the dimension of the partially-restricted open end of said push rod so as to be confined within the hollow interior thereof, the axial disposition of said caging member being manually controllable by rotation of said head so as to engage or release said spring piston and thereby to increase or decrease the compression of said spring and the position of said push rod in the absence of overriding pressure of said pressurized medium, the confined expanded interior end of said caging member being disposed so as to prevent said spring from being released from said first cup.

21. The spring brake assembly of claim 20 wherein the maximum threaded travel of said caging member within the hollow interior of said push rod is a predetermined minimum travel greater than the maximum movement of said piston and said push rod during braking operations.

22. The spring brake assembly of claim 20 wherein the open end of said push rod is partially restricted by an inner peripheral portion of said spring piston which is press fitted thereto.

23. A spring brake assembly comprising:

(a) axially-aligned first and second cups, peripheral edge portions of each being secured adjacent one another to form a spring brake chamber;

(b) a compressed power spring axially disposed within said chamber and exerting a force tending to separate said first and second cups;

(c) an axially-aligned, reciprocally-movable spring piston in said chamber, the opposed forces of said compressed power spring being exerted in one direction on the aligned interior of said first cup and in the opposite direction on said spring piston;

(d) an axially-aligned push rod having one distal end portion operatively secured to and movable with said spring piston, the other end and intermediate portions extending slidingly and sealingly through a centrally-apertured portion of said second cup for reciprocal fail-safe control of a brake actuator;

(e) a centerseal bearing disposed in said centrally-apertured portion of said second cup and comprising opposed interlocked plastic components sealed to each other by fused contact and housing a resilient sealing element in sealing contact with the surface of said push rod; and (f) a generally-annular-shaped flexible diaphragm having an outer peripheral portion radially sealed between said adjacent peripheral edge portions of said first and second cups and an inner peripheral portion sealingly secured to said spring piston adjacent the outer periphery of the spring side of said spring piston, the intermediate portion of said diaphragm being disposed within the chamber radially outwardly from the spring piston, said spring piston compressing said compressed spring still further when the spring piston is subject to a fluid medium at sufficient pressure, and to release the same upon sufficient exhaustion of the pressurized fluid medium, whereby said spring piston and said push rod are reciprocally controlled;

said one end portion of said push rod, and said spring piston being sealingly secured to each other by press-fitted engagement;

said push rod having a hollow interior with an open end disposed toward said first cup and a closed end toward the brake actuator, the open end being partially-restricted by an inner peripheral portion of said spring piston which is press fitted thereto, said hollow interior providing a housing for an axially-disposed elongated caging member having a portion extending from the open end of said push rod threaded to said first cup and having a head exposed for manual rotation and positioning of said caging member, and an opposed interior end of expanded diameter exceeding the dimension of the partially-restricted open end of said push rod so as to be confined within the hollow interior thereof, the axial disposition of said caging member being manually controllable by rotation of said head so as to engage or release said spring piston and thereby to increase or decrease the compression of said spring and the position of said push rod in the absence of overriding pressure of said pressurized medium, the confined expanded interior end of said caging member being disposed so as to prevent said spring from being released from said first cup;

the maximum threaded travel of said caging member within the hollow interior of said push rod being a predetermined minimum travel greater than the maximum movement of said piston and said push rod during braking operations; and said spring brake assembly being operatively connected to an axially-aligned second chamber housing a service brake assembly disposed for joint control of said brake actuator.

24. The spring brake assembly of claim 23 wherein said pressurized fluid medium is pressurized air.

25. The spring brake assembly of claim 23 wherein the inner peripheral portion of said generally-annular-shaped flexible diaphragm is sealingly secured adjacent the outer periphery of the spring side of said spring piston by deforming the outer periphery of the spring piston thereover to form a compressive seal.

26. The spring brake assembly of claim 23 wherein the inner peripheral portion of said generally-annular-shaped flexible diaphragm is sealingly secured adjacent the outer periphery of the spring side of said spring piston by an annular clamp band releasably secured adjacent said outer periphery of the spring side of said spring piston.

* * * * *

UNITED STATES PATENT AND TRADEMARK OFFICE
CERTIFICATE OF CORRECTION

PATENT NO. : 5,623,862

DATED : April 29, 1997

INVENTOR(S) : Roger D. Hanaway et al.

It is certified that error appears in the above-indentified patent and that said Letters Patent is hereby corrected as shown below:

On the title page,

Under [56] References Cited for U.S. Patent Documents:

"3,285,672 11/1966 Avera" should be --3,285,672 11/66 Avrea--

In Column 12, line 7 "dupont" should be --duPont--.

Signed and Sealed this

Fifth Day of August, 1997

Attest:

BRUCE LEHMAN

Attesting Officer

Commissioner of Patents and Trademarks